United States Patent
Dolgov et al.

(10) Patent No.: US 10,131,218 B2
(45) Date of Patent: Nov. 20, 2018

(54) IN-WHEEL MOTOR FOR A VEHICLE AND A VEHICLE COMPRISING THE MOTOR

(71) Applicant: "Polymagnet NW" LLC, Moscow (RU)

(72) Inventors: Leonid Viktorovich Dolgov, Saint Petersburg (RU); Aleksandr Nikolaevich Doroshenko, Saint Petersburg (RU); Aleksandr Mettalinovich Tishin, Moscow (RU)

(73) Assignee: Polymagnet NW LLC (RU)

( * ) Notice: Subject to any disclaimer, the term of this patent is extended or adjusted under 35 U.S.C. 154(b) by 0 days.

(21) Appl. No.: 15/594,341

(22) Filed: May 12, 2017

(65) Prior Publication Data

US 2018/0056767 A1     Mar. 1, 2018

(30) Foreign Application Priority Data

Aug. 24, 2016 (RU) .................................. 2016134621

(51) Int. Cl.
*B60K 7/00* (2006.01)
*B60K 1/02* (2006.01)

(52) U.S. Cl.
CPC . *B60K 1/02* (2013.01); *B60K 7/00* (2013.01)

(58) Field of Classification Search
CPC .......... B60K 1/02; B60K 7/00; B60K 7/0007; B60K 2007/0038; B60K 2007/0053; B60K 2007/0061; B60K 2007/0076; B60K 2007/0092
See application file for complete search history.

(56) References Cited

U.S. PATENT DOCUMENTS

| | | | | |
|---|---|---|---|---|
| 5,150,763 A * | 9/1992 | Yamashita | ........... | B60K 7/0007 180/242 |
| 7,287,611 B2 * | 10/2007 | Nagaya | ................... | B60G 3/01 180/65.51 |
| 7,306,065 B2 * | 12/2007 | Nagaya | ................... | B60G 3/20 180/65.51 |
| 7,423,393 B2 * | 9/2008 | Wakao | .................... | B60L 3/102 318/371 |
| 7,537,071 B2 * | 5/2009 | Kamiya | ................... | B60G 3/20 180/298 |

(Continued)

FOREIGN PATENT DOCUMENTS

EP       1977924 A1    10/2008
RU    2334626 C2     9/2008
(Continued)

*Primary Examiner* — Jacob B Meyer
(74) *Attorney, Agent, or Firm* — Hayes Soloway PC

(57) ABSTRACT

The present invention relates to a motor wheel for a vehicle and a vehicle comprising the motor wheel. The motor wheel comprises a wheel, an electric motor, a reduction gear transmitting rotation from the electric motor to the wheel, and a dampening structure connecting the wheel to a vehicle bearing member. The electric motor comprises an electric motor case. The reduction gear comprises a reduction gear case coupled to the electric motor case and rotatably mounted within the wheel hub. The electric motor case is connected to the bearing member of the vehicle and is displaceable relative to the bearing member. The invention improves dynamic properties to the vehicle, reduces vibrations transmitted to the vehicle body, and provides a more comfortable drive.

15 Claims, 7 Drawing Sheets

(56) References Cited

U.S. PATENT DOCUMENTS

| | | | | |
|---|---|---|---|---|
| 7,641,010 B2 * | 1/2010 | Mizutani | ............... | B60K 7/0007 180/65.1 |
| 7,703,780 B2 * | 4/2010 | Mizutani | ................ | B60G 3/20 280/124.1 |
| 7,766,110 B2 * | 8/2010 | Suzuki | ................... | B60G 3/01 180/65.31 |
| 7,789,178 B2 * | 9/2010 | Mizutani | ................ | B60G 3/20 180/65.51 |
| 7,938,210 B2 * | 5/2011 | Kunzler | ................ | B60G 3/01 180/65.51 |
| 7,938,212 B2 * | 5/2011 | Sakuma | .............. | B60K 7/0007 180/65.51 |
| 7,958,959 B2 * | 6/2011 | Yogo | ....................... | B60G 3/20 180/65.51 |
| 8,157,036 B2 * | 4/2012 | Yogo | ....................... | B60G 3/20 180/300 |
| 8,307,931 B2 * | 11/2012 | Akamatsu | ........... | B60K 7/0007 180/65.27 |
| 8,453,774 B2 * | 6/2013 | Nagaya | .................. | B60G 3/01 180/65.51 |
| 8,746,383 B2 * | 6/2014 | Basadzishvili | ......... | B60G 3/01 180/65.51 |
| 9,102,331 B2 * | 8/2015 | Bluethmann | ......... | B60W 10/08 |
| 9,796,235 B2 * | 10/2017 | Matayoshi | ........... | B60G 15/067 |
| 2004/0099455 A1 * | 5/2004 | Nagaya | .................. | B60G 3/20 180/65.51 |
| 2005/0247496 A1 * | 11/2005 | Nagaya | .................. | B60G 3/01 180/65.51 |
| 2005/0274560 A1 * | 12/2005 | Wakao | ................... | B60L 3/102 180/197 |
| 2006/0012144 A1 * | 1/2006 | Kunzler | ................. | B60G 3/01 280/124.125 |
| 2006/0048978 A1 * | 3/2006 | Nagaya | .................. | B60G 3/01 180/6.48 |
| 2006/0144626 A1 * | 7/2006 | Mizutani | .............. | B60K 7/0007 180/65.51 |
| 2006/0225931 A1 * | 10/2006 | Kurata | ................. | B60K 7/0007 180/65.51 |
| 2007/0068715 A1 * | 3/2007 | Mizutani | ................ | B60G 3/20 180/65.51 |
| 2007/0209852 A1 * | 9/2007 | Kamiya | ................... | B60G 3/20 180/65.51 |
| 2008/0017462 A1 * | 1/2008 | Mizutani | ................ | B60G 3/20 188/266.1 |
| 2008/0093133 A1 * | 4/2008 | Yogo | ....................... | B60G 3/20 180/55 |
| 2008/0283315 A1 * | 11/2008 | Suzuki | .................... | B60G 3/01 180/65.51 |
| 2008/0289891 A1 * | 11/2008 | Yogo | ....................... | B60G 3/20 180/65.51 |
| 2009/0133944 A1 * | 5/2009 | Nishioka | ................ | B60G 3/20 180/65.51 |
| 2009/0236157 A1 * | 9/2009 | Akamatsu | ........... | B60K 7/0007 180/55 |
| 2009/0236158 A1 * | 9/2009 | Sakuma | ............... | B60K 7/0007 180/65.51 |
| 2010/0000811 A1 * | 1/2010 | Iwano | .................... | B60G 7/008 180/65.51 |
| 2011/0209938 A1 * | 9/2011 | Basadzishvili | .......... | B60G 3/01 180/305 |
| 2014/0000970 A1 * | 1/2014 | Munster | ............... | B60K 7/0007 180/55 |
| 2014/0203622 A1 * | 7/2014 | Yamamoto | ............... | B60G 3/20 301/6.5 |
| 2015/0083508 A1 * | 3/2015 | Bluethmann | ......... | B60W 10/08 180/204 |
| 2018/0056767 A1 * | 3/2018 | Dolgov | ................. | B60K 7/00 |

FOREIGN PATENT DOCUMENTS

| | | |
|---|---|---|
| RU | 2468936 C2 | 12/2012 |
| WO | 2014013084 A1 | 1/2014 |

* cited by examiner

IN-WHEEL MOTOR FOR A VEHICLE AND A VEHICLE COMPRISING THE MOTOR

FIELD OF THE INVENTION

The present invention generally relates to transport engineering, particularly, to electric motor wheels for electric and hybrid electric wheeled vehicles.

BACKGROUND OF THE INVENTION

Transport engineering is one of the most technically developed and ever growing industries. One of the industry development trends deals with replacing combustion engines powering most conventional vehicles with alternative drives. Currently attention is focused on hybrid electric vehicles and electric vehicles driven by eco-friendly electric motors and motor wheels.

Hybrid electric vehicles and electric vehicles driven by electric motor wheels have a number of advantages over conventional vehicles using combustion engines. Such advantages include fewer complex and heavy transmission gears between the motor and the wheel (clutch, transmission, drive shafts and differentials), improved dynamics, maneuverability, fuel efficiency, and road safety. However, conventional motor wheels possess a number of significant drawbacks, the most important of which is high unsprung weight of motor wheel. Furthermore, small high-speed electric motors comprised in motor wheels require a reduction gear which transfers rotational torque transmitted to the wheel by the electric machine, wherein said gear has to be small due to limited space within the motor wheel. Therefore, conventional hybrid electric vehicles, such as cars, electric cars and buses provided with motor wheels, have high unsprung weight, resulting in a less comfortable drive in such vehicle due to vibrations being transmitted to the vehicle body, worse handling, and significant increase in car suspension wear when driving at high speeds or on roads with low surface quality. Further, one of the most significant disadvantages of the conventional motor wheels is structural complexity, and therefore, a large number of parts comprised in the motor wheel, which leads to an excessive increase in motor wheel costs and significantly limits production rates.

RU2334626 (B60K7/00) discloses a motor wheel for an electric vehicle, the motor wheel comprising an electric motor comprising an electric motor stator fixedly mounted on load-bearing suspension members of the vehicle wheel and an electric motor rotor. The electric motor rotor is arranged on the vehicle wheel hub, wherein the active rotor member, with a "squirrel cage" consisting of two steel rings connected to each other by means of steel pins arranged therein, is made of a light-alloy material, comprises a ring-shaped insert with a flange having openings therein, and is affixed to the hub by means of screws. The gap between the ring-shaped insert and the wheel hub is filled with a polymer adhesive. The design of the prior art motor wheel is relatively simple due to combining the rotor with the wheel hub, and the weight of the wheel is lower due to a decrease in active rotor member weight. However, the disadvantage of the prior art motor wheel is a lack of electric motor springing; thus the electric motor weight is a component of unsprung weight of the electric vehicle. The lack of electric motor springing leads to an increased risk of rotor deformation during dynamic wheel vibrations, which breaks the uniformity of the gap between the rotor and the stator and can lead to rotor rotation jamming.

WO2014013084 (B60K7/00, B60K17/04) discloses a motorized hub comprising reduction means, the hub comprising an electric traction machine with an external stator connected to the hub carrier and an internal rotor. The prior art motorized hub further includes reduction means comprising three reduction stages and coupling/uncoupling means for coupling with the reduction means and for uncoupling therefrom. A significant disadvantage of the prior art motorized hub is a significant weight of the structure, and, therefore, high unsprung weight of the vehicle, which leads to a significantly less comfortable drive and a decrease in dynamic stability of the vehicle. Further disadvantages include high load on parts of the motorized hub in operation.

US20060144626 (B60K1/00, B60K7/00, F16H57/02) describe an in-wheel motor, comprising a wheel, an electric motor, a reducer (planetary reduction gear) for transmitting rotation from the electric motor to the wheel, a damper mechanism connecting the outer part of the electric motor case with the knuckle in such manner that the electric motor case can vibrate in vertical direction. The disadvantages of the solution include structural complexity, high manufacturing costs and high weight due to, in particular, the required significant strengthening of the electric vehicle body.

SUMMARY OF THE INVENTION

An object of the present invention is to provide an electric or hybrid electric wheeled vehicle that is comfortable in use and has improved dynamics and extended suspension service life.

A further object of the present invention is to provide a motor wheel with an electric motor and a reduction gear, the wheel providing effective dampening of wheel vibrations and reduction of load on the electric motor rotor.

Still further object of the present invention is to reduce the number of structural parts of the motor wheel providing dampening of wheel vibrations, to simplify the structure and to reduce production costs in order to allow large-scale manufacturing of such motor wheel.

The objects are achieved by a motor wheel for a wheeled vehicle and a vehicle comprising the motor wheel, wherein the motor wheel comprises a wheel comprising a wheel hub and at least one hub bearing, an electric motor comprising a stator and a rotor having a rotor shaft, enclosed within an electric motor case, a dampening structure mounted between the wheel hub and a vehicle bearing member to allow vertical movement of the wheel relative to the bearing member and dampening such movement, a reduction gear transmitting movement from the electric motor to the wheel hub and comprising a reduction gear case attached to the electric motor case, an input member of the reduction gear and an output member of the reduction gear engaged with the input member, wherein the input member is arranged on the rotor shaft, and the output member comprises an output shaft mounted parallel to the rotor shaft, the output shaft being fixedly connected to the wheel hub, and the reduction gear case is rotatably mounted within the wheel hub, and the electric motor case is connected in movable manner to the dampening structure.

Thus, unsprung mass of the motor wheel is decreased as the electric motor case is supported by the vehicle suspension system, thereby improving dynamic properties of the vehicle, decreasing vibrations transmitted to the vehicle body and providing a more comfortable drive, as well as significantly simplifying motor wheel structure and reducing manufacturing costs.

In one embodiment of the present invention, the dampening structure comprises a connecting yoke having two opposite ends and a cylindrical connecting portion, wherein the cylindrical portion is received in the wheel hub and mounted on the at least one hub bearing in such manner that the wheel hub can rotate relative to the cylindrical end without axial displacement relative thereto, a rod extending between the ends of the connecting yoke and connected thereto, damper springs, and a support mounted on the rod and movable along the rod, the support being connectable with the vehicle bearing member, wherein each damper spring is mounted between the yoke ends and the support.

In another embodiment, the electric motor case of the motor wheel has a cylindrical shape and comprises an axial protrusion, wherein a guiding groove is arranged within the support, and wherein the motor wheel further comprises a receiving part movably mounted in the guiding groove and connected with the axial protrusion.

According to a particular embodiment, the axial protrusion is connected with the receiving part so as to form a joint hinge.

In another embodiment, the receiving part is able to rotate while moving in the guiding groove. The rotation allows to lower friction caused by movement of the axial protrusion relative to the support.

According to yet another embodiment, the motor wheel further comprises a damper mounted between the support and the receiving part to dampen movement of the receiving part relative to the support.

According to another embodiment, the electric motor of the motor wheel is one of a synchronous salient-pole electric motor and a synchronous electric motor with permanent magnets.

According to another embodiment, the electric motor of the motor wheel is an electric motor with one of a radial, axial and transverse magnetic flux direction.

According to an embodiment of the present invention, the reduction gear is a gear reducer comprising a reducer case, the input member of the gear comprises a driver gear and an output member of the gear comprises a follower gear and an output shaft, mounted within the reducer case, wherein the driver gear is integral with the electric motor rotor shaft, and the follower gear is fixedly mounted on the output shaft and engaged with the driver gear. The use of a gear reducer allows to further reduce the dimensions of the reducer gear and to make the motor wheel more compact.

According to yet another embodiment, the reduction gear is a belt drive comprising a belt drive case, the input member of the drive comprises a driving pulley and the output member of the drive comprises a following pulley coupled to the driving pulley by means of a belt and an output shaft, mounted within the belt drive case, wherein the driving pulley is integral with the electric motor rotor shaft, and the following pulley is fixedly mounted on the output shaft.

According to yet another embodiment, the reduction gear is a chain drive comprising a chain drive case, the input member of the drive comprises a driving sprocket and the output member of the drive comprises a following sprocket coupled to the driving sprocket by means of a chain and an output shaft, mounted within the chain drive case, wherein the driving sprocket is integral with the electric motor rotor shaft, and the following sprocket is fixedly mounted on the output shaft.

According to yet another embodiment, the reduction gear is a variable drive comprising a variable drive case, the input member of the drive comprises a driving pulley and the output member of the drive comprises a following pulley coupled to the driving pulley by means of a belt and an output shaft, mounted within the variable drive case, wherein each of the pulleys comprises a pair of cones facing each other and mounted coaxially and movable relative to each other in order to adjust reduction ratio, wherein the driving pulley is mounted on the electric motor rotor shaft, and the following pulley is mounted on the output shaft.

According to yet another embodiment, the reduction gear is a magnetic gear reducer comprising a reducer case, the input member of the reducer comprises a driver gear and the output member comprises a follower gear and an output shaft, mounted within the reducer case, wherein the driver gear is integral with the electric motor rotor shaft, and the follower gear is fixedly mounted on the output shaft and engaged with the driver gear.

According to a particular embodiment, the output shaft of the reducer gear is connected with the wheel hub by means of a splined joint.

BRIEF DESCRIPTION OF THE DRAWINGS

The present invention is described below in more detail with reference to the accompanying drawings, wherein.

DETAILED DESCRIPTION OF THE INVENTION

Figure 1:
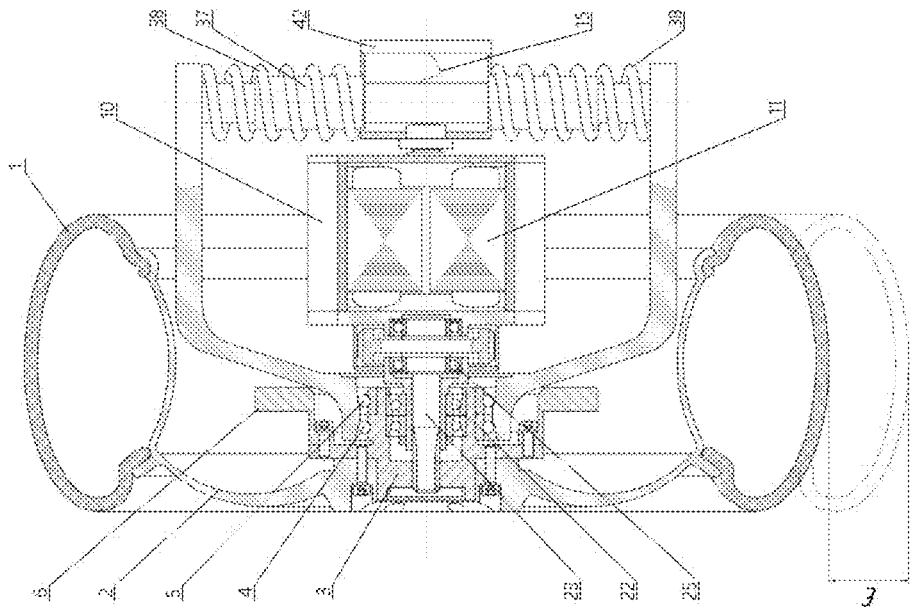
FIG. 1 shows a side sectional view and a side view of the motor wheel according to the preferred embodiment without vertical displacement (when the wheel moves on a smooth road)
Figure 1:
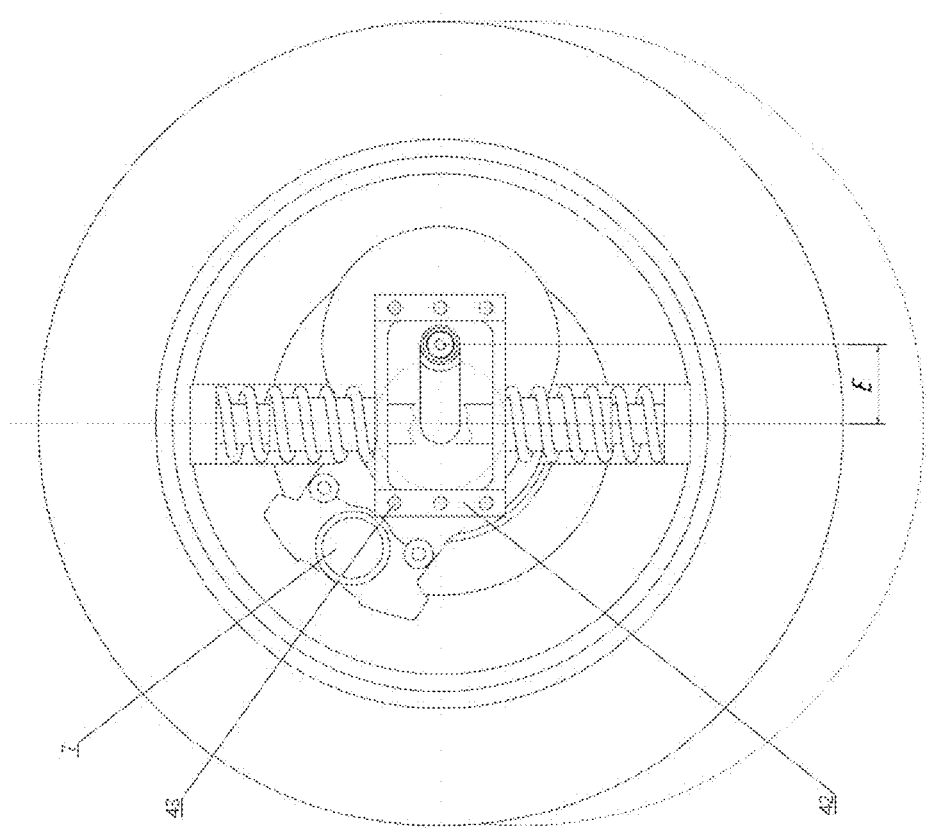
Figure 2:
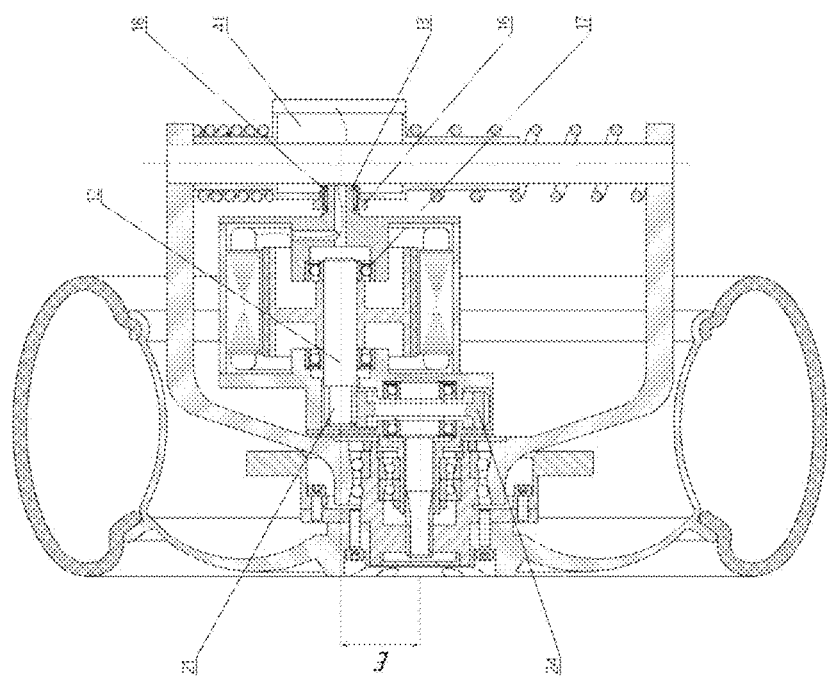
FIG. 2 shows a side sectional view and a side view of the motor wheel of FIG. 1 during downward displacement (when driving over a pothole on the road)
Figure 2:
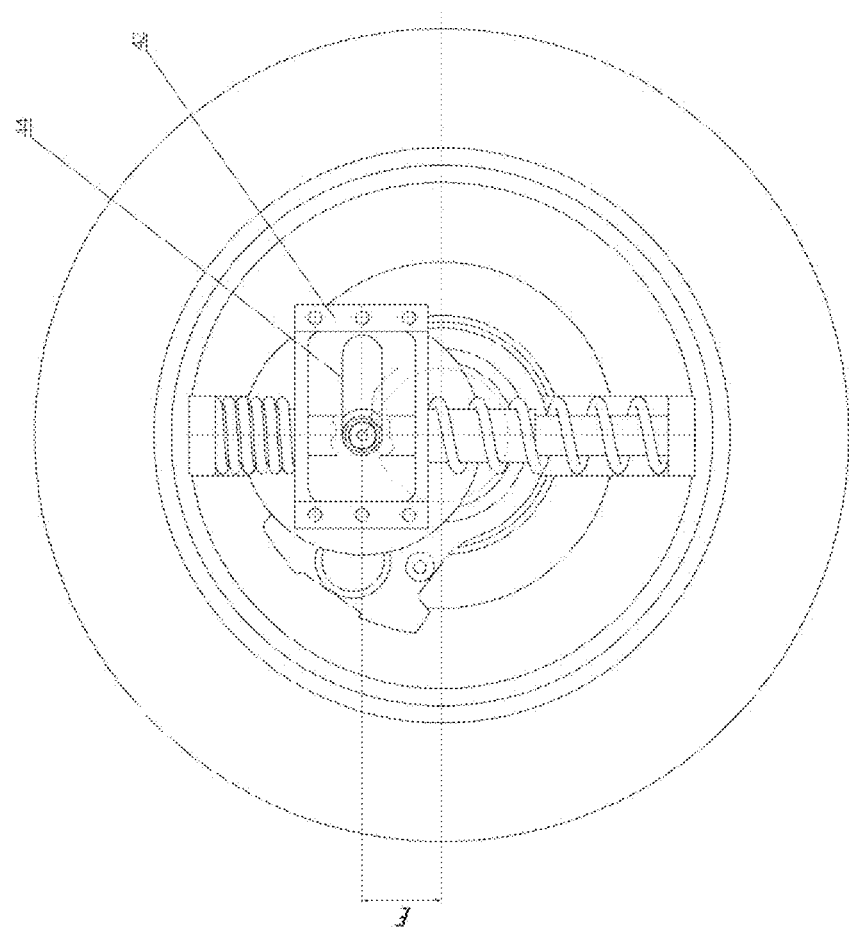
Figure 3:
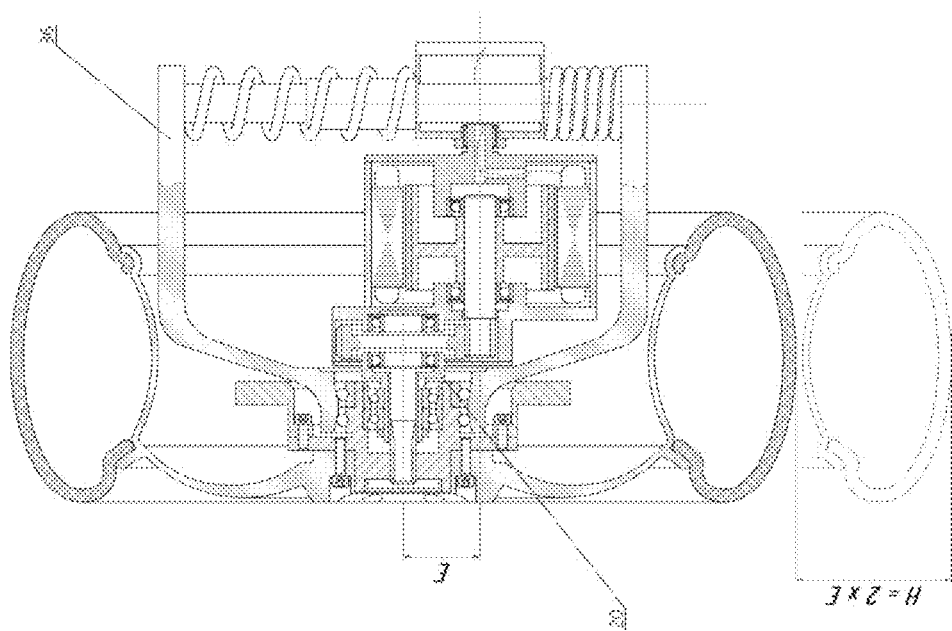
FIG. 3 shows a side sectional view and a side view of the motor wheel of FIG. 1 during upward displacement (when driving over a hump on the road)
Figure 3:
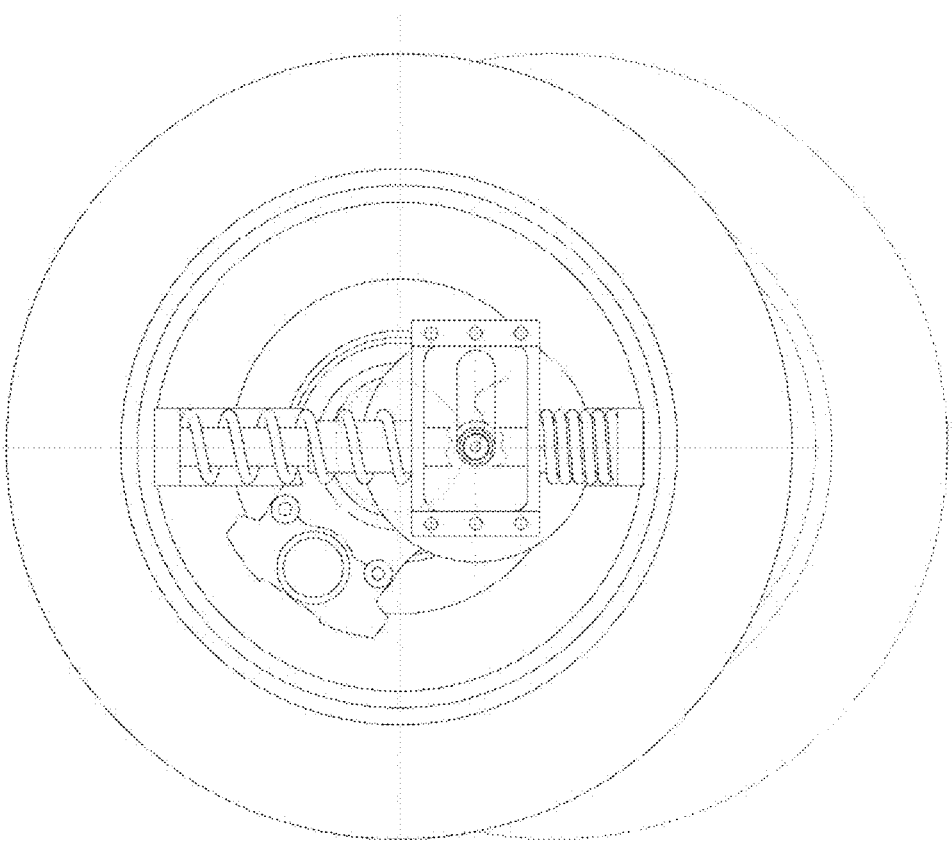

FIGS. 1-3 show the motor wheel according to the preferred embodiment of the present invention. The motor wheel comprises a wheel, an electric motor and a reduction gear formed by an oil-filled single gear reducer with parallel axes spaced apart from each other by a distance E.

The wheel comprises a tire 1, a wheel rim 2 with the tire 1 mounted thereon, a wheel hub 3 fixedly coupled with the rim 2 by means of a bolt coupling, two hub bearings 4, 5 mounted on the hub 3, a brake disc 6 coaxially coupled with the hub 3 by means of a bolt coupling, and a brake cylinder 7 for forcing brake shoes (not shown) against the brake disc 6 to provide vehicle braking.

The electric motor of the motor wheel comprises an electric motor case 10 with an electric motor stator 11 and an electric motor rotor received therein. The rotor comprises an electric motor rotor shaft 12 rotatably mounted in bearings 17. Electric current for operation of the electric motor is supplied via a conductor 15 coupled to a power source, such as an electrical rechargeable battery. The electric motor of the motor wheel is water-cooled and is a synchronous electric motor with permanent magnets. The synchronous electric motor with permanent magnets is highly efficient, compact and provides rapid and timely adjustment of shaft rotation speed in order to provide the required wheel rotation speed at the same time.

Preferably, an electric motor with the following main characteristics can be used: rated torque: 52 N·m, max torque: 104 N·m, rotation frequency: 7000 rpm, rated power: 31 kW, max power: 60 kW, weight: 10.5 kg, rotor inertia: 0.0012 kg·m2, dimensions: 120×200 cm.

According to alternative embodiments, the electric motor can be a synchronous salient-pole electric motor, or an electric motor with radial, axial or transverse magnetic flux direction.

The gear reducer of the motor wheel comprises a reducer case 20 having a cylindrical shape and housing oil for lubricating rubbing parts of the reducer. The use of an oil-filled reducer eliminates the need for frequent reducer maintenance, thus increasing the time interval between required vehicle maintenance sessions. Further, the reducer comprises a driver gear 21 integral with the rotor shaft 12 and a follower gear 24 rotatably mounted within the case 20. As seen in FIGS. 2-3, the rotor shaft 12 extends from the electric motor case 10 and into the reducer case 20, thus providing engagement of wheels 21 and 24 adapted for transmitting rotation. Preferably, wheels 21 and 24 are sized in such manner that the gear ratio is within the range of 3 to 6, which is an optimal value range for providing oscillating speed values on the rotor shaft 12 of the electric motor at a constant wheel rotation speed. Preferably, the gear reducer can have the following characteristics: weight: 3 kg, reduction coefficient: 4, interaxial distance: 75 mm.

The gear reducer of the motor wheel further comprises an output shaft 23. The rotation of the gear 24 is provided by mounting the gear on the output shaft 23 arranged in the case 20 on output shaft bearings 25. In order to simplify the structure, the gear 24 can be provided as a separate part from the shaft 23 and can be coupled thereto, e.g., by press-fitting. Bearings 25 comprise an outer ring mounted within the case 20 fixedly relative thereto, and an inner ring, also fixedly mounted on the output shaft 23.

The output shaft 23 is connected with the wheel hub 3 by means of a splined joint, with corresponding splines (grooves) and teeth arranged on the shaft 23 and in the hub 3. The shaft 23 can be connected with the hub 3 using other suitable methods, e.g., using a sleeve coupling. Furthermore, the output shaft 23 can be provided with a rotation speed sensor, thus providing measurements of vehicle movement speed and adjustments thereof.

The case 20 is rotatably mounted in the hub 3 on case bearings 22, wherein the case 20 is coupled with the electric motor case 10, forming a substantially integral part. In order to prevent oil from leaking out or into the case 10 from the case 20, sealing elements such as rubber O-rings (not shown) can be installed on the rotor shaft 12 and on the output shaft 23.

According to other particular embodiments, the reduction gear can be a belt drive, a chain drive or a variable drive. Furthermore, the reduction gear can be a magnetic gear reducer.

The dampening structure of the motor wheel comprises a connecting yoke 36 having two ends and a cylindrical connecting portion extending into the wheel hub 3 and mounted on the hub bearings 4, 5. As seen in FIGS. 1-3, rolling bodies of the bearing 4 are arranged between the hub 3 forming the inner bearing 4 ring and the cylindrical portion of the yoke 36 forming the outer bearing 4 ring. The bearing 5 differs from the bearing 4 in that the inner ring thereof is formed by an individual cylindrical member placed within a corresponding slot in the hub 3, which prevents axial displacement of the bearing. The bearing 4 is also prevented from axial displacement, which is implemented by means of special fixing members, e.g., by means of ring stoppers. Such structure of bearings 4, 5 provides a reduction in size of the cylindrical portion of the yoke 36 and in weight thereof, and further allows to mount the cylindrical portion within smaller wheel hubs 3. The mounting of the cylindrical portion on bearings 4, 5 allow rotation of the wheel hub 3 relative to the cylindrical portion of the yoke 36 without axial displacement of the hub 3 relative to the portion.

The dampening structure further comprises a rod 37 having a cylindrical shape, which transversely extends between the two ends of the connecting yoke 36 and is fixedly coupled therewith by fasteners, damper springs 38 and a support 41. As seen in FIGS. 1-3, the support 41 is formed by a hollow member having a central box part formed by an upper wall, a lower wall and two side walls, and two tubular parts extending vertically from the upper wall and from the lower wall, respectively. The rod 37 passes through the tubular parts of the support 41 in such manner that the rod 37 can move along the support 41 and can be rotated about its axis in order to rotate the motor wheel and to control the steering of the vehicle. The yoke 36 and the rod 37 form a substantially closed contour thus increasing strength and operating life of the motor wheel.

The rod 37 can be rotated by any means known in the art. For example, the rod 37 can be rotated about its axis by means of a worm gear reducer driven by the steering wheel elements of the vehicle. It is contemplated that the rod 37 can be fastened without rotation thereof about its axis. Such an embodiment includes mounting the motor wheel on a bearing member rotatable relative to the vehicle, e.g. on a rotating bracket or a rotating frame member. In this case, the vehicle is steered by rotating the corresponding bearing member.

Damper springs 38 are attached to the yoke 36 and by the upper and the lower walls of the support 41, respectively, which provides dampening of the vertical vibrations of the yoke 36 and of the entire motor wheel relative to the support 41. The attachment of the springs 38 to the yoke 36 and the support 41 provides the combined action thereof to restore equilibrium of the yoke 36, and further increases compression strength of the springs and prevents transverse displacement thereof.

For the sake of clarity, FIGS. 1-3 show that the yoke 36 extends beyond the edge of the wheel disc 2, however it is apparent that the entire motor wheel structure, including the yoke 36, can be substantially received within the wheel disc 2, thus reducing or eliminating contact between the yoke and the ground or obstacles when the vehicle moves. The above can be achieved by selecting electric machine diameter relative to the axial length thereof for each specific wheel type (tire and rim width).

The support 41 can be connected with a vehicle bearing member, which can be a vehicle frame (in case of mounting the present motor wheel on frame vehicles such as freight cars or buses) or a vehicle case (when mounting the motor wheel on frameless vehicles mostly represented by passenger cars). The bearing member is not limited to the disclosed examples, and other suitable part of the vehicle can be used for fastening the motor wheel. The connection between the support 41 and the bearing member can be arranged by means of a bolt connection, wherein the support 41 comprises a flange part 42 with mounting holes 43.

As can be seen on FIGS. 1-3, the electric motor case 10 is further connected to the bearing member via the support

41. Preferably, said connection, as shown in FIGS. 1-3, is provided by forming an axial protrusion 13 in the electric motor case 10, wherein a guiding groove 44 is formed in a side wall of the support 41, and a receiving part 16 is movably installed in the groove 44. The receiving part 16 has a flange preventing the part 16 from leaving the guiding groove 44. The receiving part 16 is mounted on a bearing 18 allowing rotation of the part 16 about its axis during linear displacement thereof in the guiding groove 44. The bearing 18 is mounted on a joint hinge (not shown) connected to the axial protrusion 13 in a manner providing rotation of the case 10 relative to the receiving part 16 after the rod 37 is rotated about its axis. According to alternative embodiments, the above connection can be provided by mounting the axial protrusion 13 on a linear rail, crank or screw pair.

Figure 4:
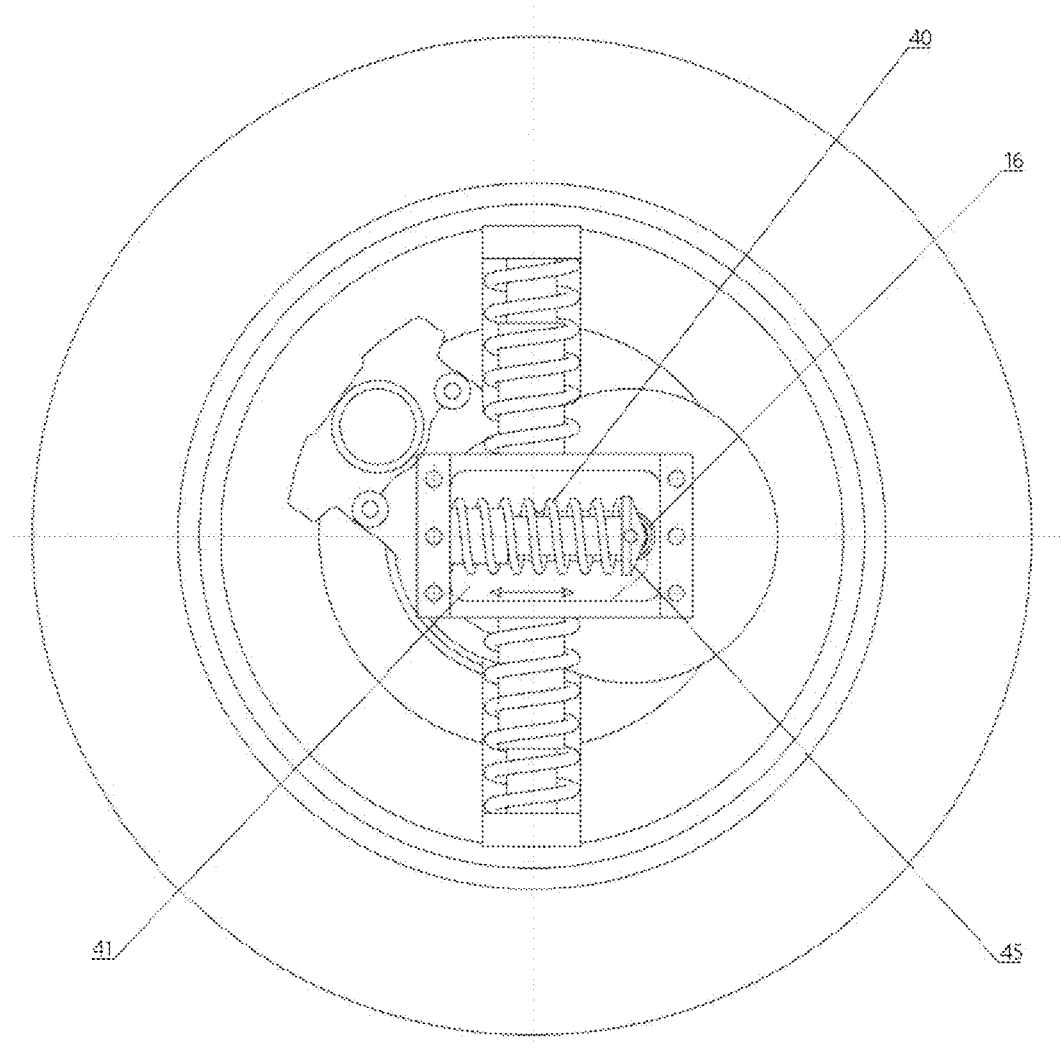
FIG. 4 shows a side view of the motor wheel according to a particular embodiment, wherein, in addition to the embodiment of FIG. 1, a damper is mounted for dampening movement of the electric motor case.

FIG. 4 shows a view of the support 41 from the vehicle side. As seen in FIG. 4, in a specific example, a damper 40 formed by a coiled compression spring is arranged between the support 41 and the receiving part 16. The damper 40 is supported by the inner surface of the sidewall of the support 41 on one side, and by the end of the receiving part 16 extending into the support 41 on the other side. In order to provide secure mounting of the damper 40, a fixed support plate 45 extending to provide support for the damper 40 can be mounted at the end of the receiving part 16 extending into the support 41.

The motor wheel is operated as follows. The electrical current from an invertor enters the electric motor stator 11 via the conductor 15. The interaction between the magnetic field generated by the permanent magnets arranged on the electric machine rotor and the magnetic field generated by currents passing in stator coils 11 causes rotation of the rotor shaft 12 formed integral with the driver gear 21. The gear 21 transfers rotational torque to the follower gear 24, wherein, due to the difference in diameter between the gears 21 and 24, the follower gear 24 rotation speed decreases, and the moment of force increases. The output shaft 24 formed integral with the gear 24 transmits rotation via the splined joint with the hub 3 to the wheel, thus moving the vehicle. The position of rotor shaft 12 is controlled by the positional sensor transmitting data to the invertor. The motor wheel structure can further comprise oil temperature sensors for the reducer and the bearing units, an oil level sensor, a vertical acceleration sensor, etc.

FIG. 1 shows the relative positions of motor wheel parts during vehicle movement on a smooth road surface. In particular, as seen in FIG. 1, the yoke 36 is in equilibrium in the middle of the rod 37, the damper springs 38 are compressed equally (have identical interturn distance), and the receiving part 16 is in a leftmost position in the guiding groove 44.

FIG. 2 shows change in relative positions of motor wheel parts when the vehicle moves over a pothole on the road. In this case, the motor wheel moves vertically downwards relative to the support 41 attached to the bearing member. The motor wheel is shown at the lowermost point of its vertical displacement for clarity. Said displacement leads to compression of the upper damper spring 38, to circular movement of the electric motor case 10 about the wheel axis, and to translation in the guiding groove 44. The circular movement of the case 10 causes rotation of the reducer case 20 in the case bearings 22. Upon circular movement of the case 10, the driver gear 21 performs circular movement around the follower gear 24, wherein the output shaft 23 remains engaged with the hub 3 and continuously transfers rotational torque to the wheel. The use of a synchronous electric motor with permanent magnets provides rapid and timely adjustment of rotor shaft 12 rotation speed and provides shock-free displacement of the driver gear 21 along the follower gear 24 of the gear reducer. Such arrangement of the electric motor allowing the motor to transfer rotational torque to the wheel via the gear reducer and simultaneously move relative to the wheel axis provides affixing the motor substantially to the bearing member (via the support 41) and reducing unsprung weight of the motor wheel.

FIG. 3 shows the change in relative positions of motor wheel parts while moving over a hump on the road. In this case, the motor wheel moves vertically upwards relative to the support 41 attached to the bearing member. The motor wheel is shown at the uppermost point of its vertical displacement for clarity. Said displacement leads to compression of the lower damper spring 38, to circular movement of the electric motor case 10 about the wheel axis, and to translation in the guiding groove 44, as described above. Thus, the case 10 is rotated in the direction opposite to the direction mentioned above.

Therefore, the electric motor forms a hunting link of the motor wheel and is fastened substantially to the bearing member; thus, while moving on an uneven road surface, the electric motor performs circular movement about the wheel in both directions relative to the position shown in FIG. 1, and simultaneously performs translation relative to the guiding groove 44, which is arranged substantially perpendicular to the rod 37. The vertical movement of the wheel and the electric motor is dampened by damper springs 38, thus avoiding bumps when encountering obstacles and extending service life of the motor wheel. The translation of the axial receiving part 16 is dampened by the damper 40, which also reduces vibration and extends service life of the motor wheel.

As evident from FIG. 3, the vertical displacement of the motor wheel is limited by the value H=2E, where E is the distance between the rotor shaft 12 axis and the reducer output shaft 23. The circular movement of the electric motor is limited by 180 degrees, and the translation (movement in the guiding groove 44) does not exceed E.

When the wheel is to be rotated in order to steer the vehicle, the rod 37 is rotated about its axis to a required angle, e.g., using a worm gear reducer, wherein the hinge joint connection between the case 10 and the support 41 does not prevent said rotation.

Furthermore, the motor wheel can be mounted on a console vehicle member (a rotating bracket or a rotating frame member) to rotate relative to the bearing member. In this case an embodiment is contemplated, wherein the rotation is performed to 90 degrees, wherein wheel axes are arranged perpendicular to the vehicle movement direction. When using a passenger car, such wheel arrangement provides easy parking of the vehicle in limited space.

Braking using the vehicle provided with the present motor wheel can be performed in a conventional manner by forcing brake shoes against brake discs 6 with simultaneous power cutoff to the electric motor, or by switching the electric motor to a electrodynamic braking mode without using conventional braking, or using a combination of the described braking methods. Vehicle braking in the electrodynamic braking mode increases service life of the braking system and reduces vehicle operation costs, and, similar to other hybrid electric and electric vehicles, provides recharging of the vehicle battery.

The present invention can be used in any vehicles utilizing motor wheels, such as passenger cars, freight cars, buses and other vehicles. The present invention can be also used with robotic or driverless means of transportation. In the event of using the present motor wheels on several vehicles, a synchronous movement of said vehicles can be provided, e.g., for preserving distance between vehicles in city traffic.

Figure 5:
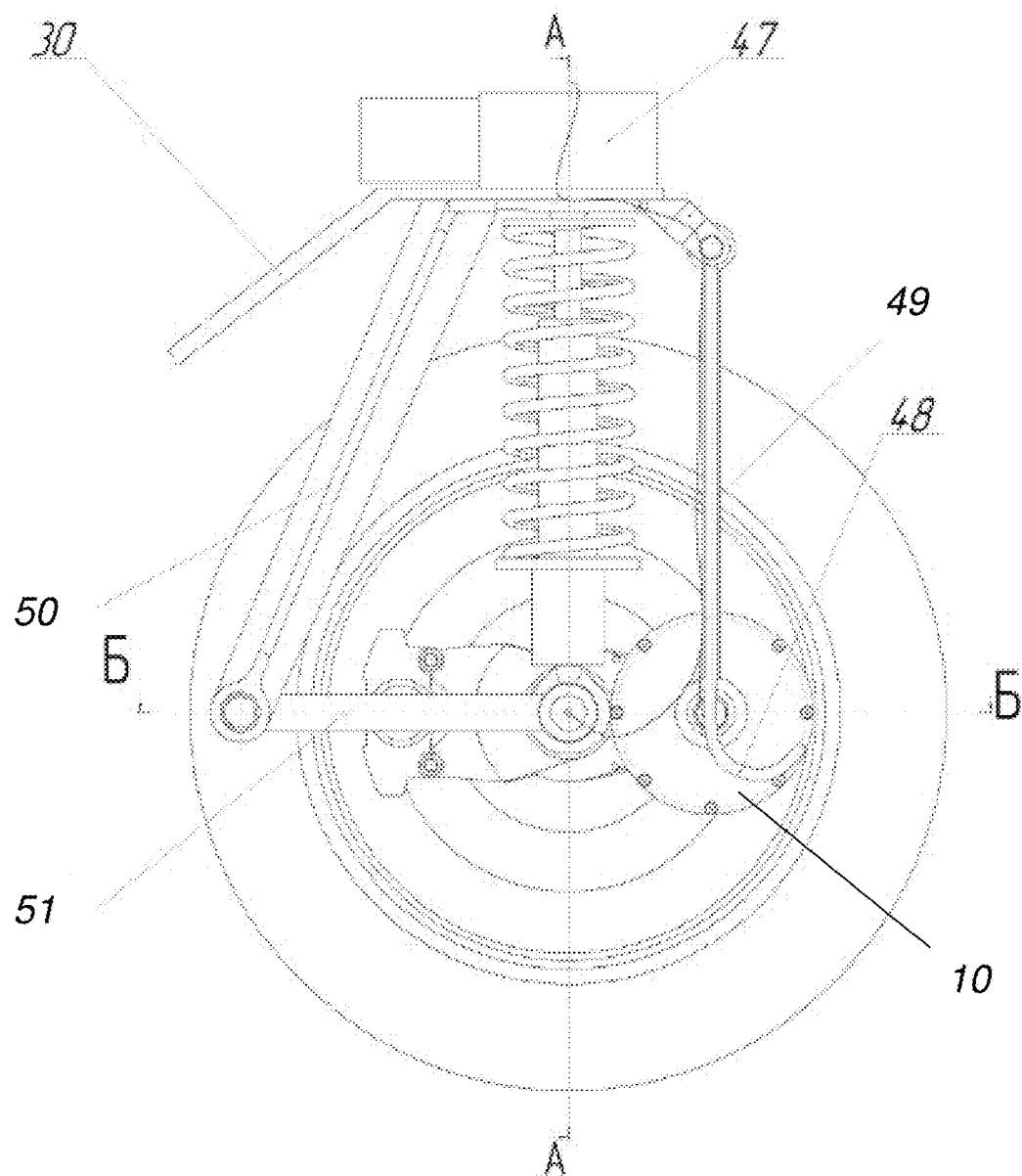
FIG. 5-7 shows a side view and two side sectional views of the motor wheel according to another preferred embodiment.
Figure 6:
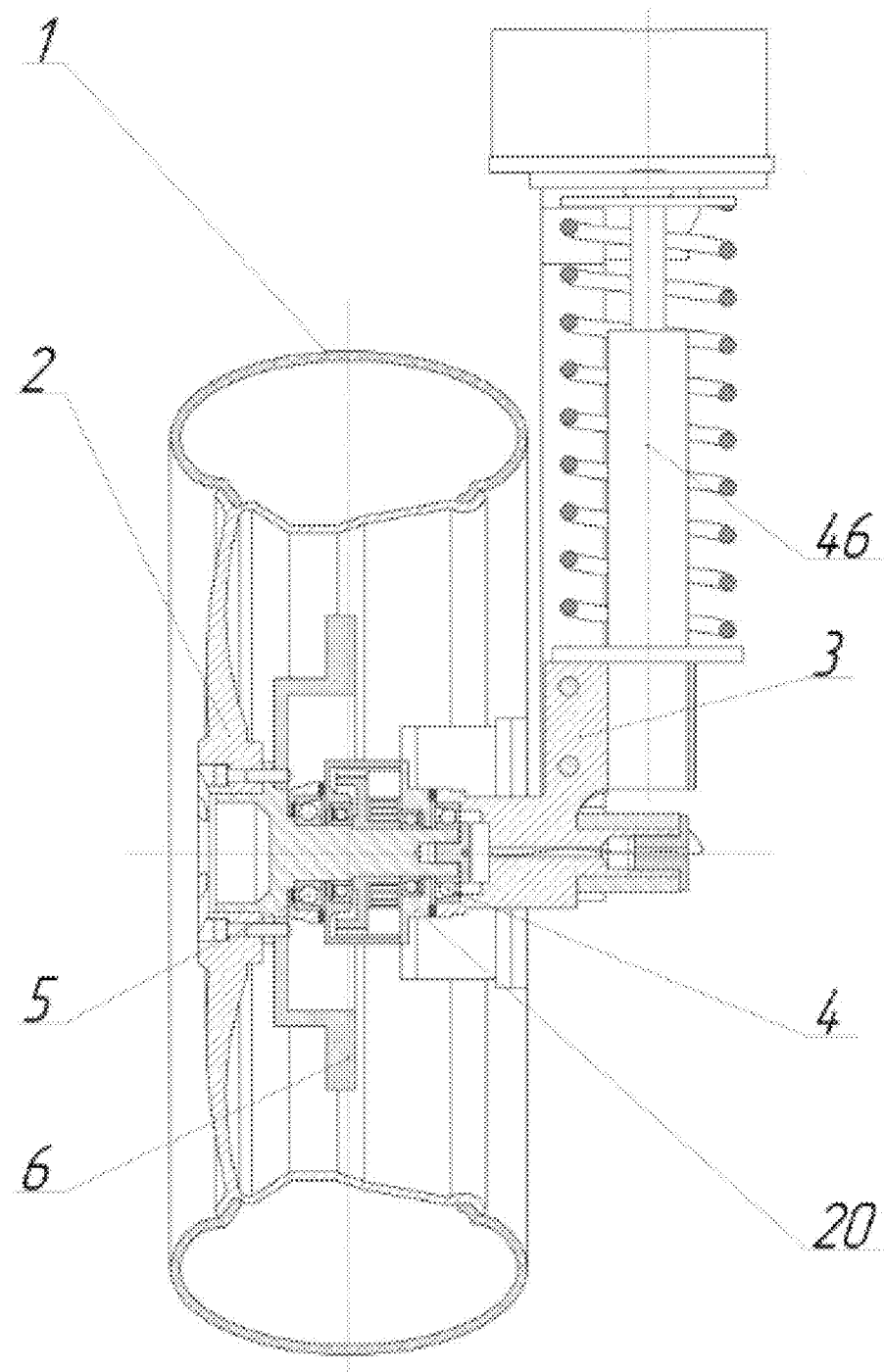
Figure 7:
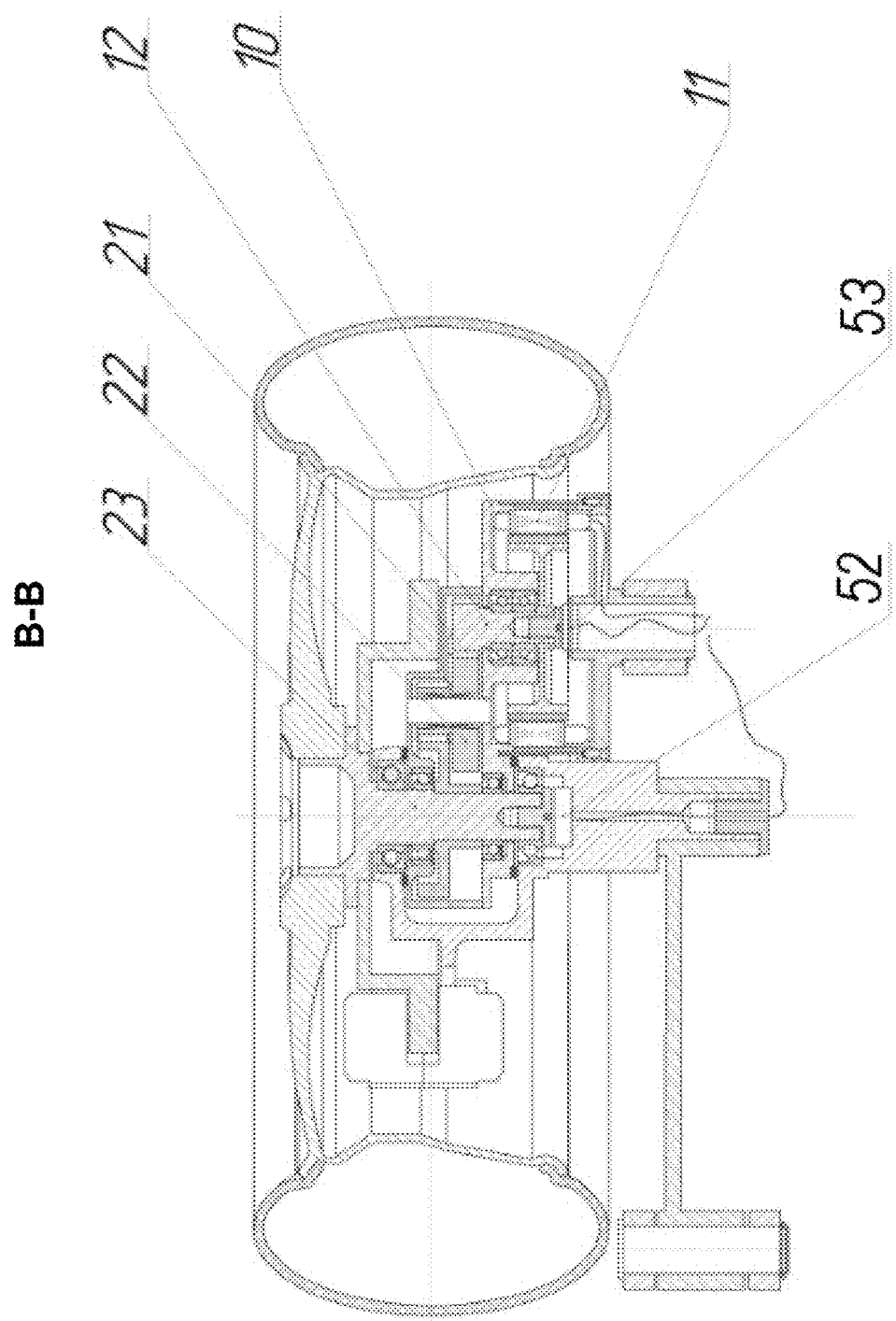

FIG. 5-7 shows another embodiment of the motor wheel according to present invention. The same reference numerals on FIG. 5-7 refer to the same elements as shown on FIG. 1-3. The motor wheel according the embodiment may be mounted on a vehicle comprising conventional suspension with struts assemblies.

As can be seen on FIGS. 5-7 the motor wheel according the present embodiment comprises a wheel, an electric motor and a reduction gear. The wheel, electric motor and reduction gear here are of the same construction as in the motor wheel shown on FIGS. 1-3. The distinction of the wheel according to the present embodiment consists in that it comprises a support structure comprising a rotatable platform 30 mounted on an output shaft of a wheel turning drive 47, a link rod 49, pivotally mounted on the rotatable platform 30 at one end and connected to the electric motor case 10 at the other end, a support arm 50, mounted on the rotatable platform 30 at one end and rotatably connected to a trailing arm 51 at the other end, the trailing arm 51 is pivotably connected to the wheel hub 3. A flexible tube 48 is installed along the link rod 49 to provide a cooling lubricant flow to the electric motor case 10. Electric cables, supplying energy to the electric motor are provided along the link rod 49 as well.

FIG. 6 shows the side view of the motor wheel according to the present embodiment during vehicle movement on a smooth road surface. As shown on the FIG. 6, the wheel hub 3 of the motor wheel is fixedly mounted on a strut 46 of conventional suspension. The strut 46 connected to the vehicle suspension carries rotatable platform 30. The arm 51 is rotatably attached to the strut 46 so that when the strut 46 moves vertically, the arm 51 performs rotational movement. The support structure of the motor wheel, therefore, carried by the strut 46 of conventional vehicle suspension.

FIG. 7 shows the bottom view of the motor wheel according to the present embodiment during vehicle movement on a smooth road surface. As shown on the FIG. 7, the motor wheel comprises a wheel position sensor 52 on the output shaft 23 of the gear reducer and a rotor position sensor 53 on the electric motor rotor shaft 12.

The link rod 49 allows free rotational movement of the electric motor in horizontal plane, as it remains fixed in vertical plane, thus when the motor wheel moves on uneven road, the wheel moves vertically while the electric motor case 10 performs circular movement within the wheel around axis thereof in both directions relative to the position shown in FIG. 5. Vertical movement of the wheel leads to displacement of the support arm 50 and trailing arm 51, as the electric motor case 10 performs circular movement. The unsprung weight of the motor wheel is reduced, as the motor case 10 ad reduction gear case are carried by the rotatable platform 30 supported by strut 46.

The wheel turning drive 47 allows the motor wheel to turn by turning the rotatable platform 30.

It is evident that the embodiments of the present invention described above are not meant to be limiting, and the scope of the invention is limited only by the accompanying claims.

REFERENCE NUMERALS

1. Tire
2. Wheel rim
3. Wheel Hub
4. Hub bearing
5. Hub bearing
6. Brake disc
7. Brake cylinder
10. Electric motor case
11. Stator
12. Electric motor rotor shaft
13. Axial protrusion of the case
15. Conductor
16. Receiving part
17. Electric motor shaft bearings
18. Receiving part bearing
20. Gear reducer case
21. Driver gear
22. Case bearing
23. Reducer output shaft
24. Follower gear
25. Reducer output shaft bearing
30. Rotatable platform
36. Connecting yoke
37. Rod
38. Damper springs
40. Damper
41. Support
42. Flange part of the support
43. Mounting holes
44. Guiding groove
45. Support plate
46. Damper strut
47. Wheel turning drive
48. Flexible tube
49. Link rod
50. Support arm
51. Trailing arm
52. Wheel position sensor
53. Rotor position sensor

What is claimed is:

1. A motor wheel for a vehicle, the motor wheel comprising:
    a wheel comprising a wheel hub and at least one hub bearing,
    an electric motor comprising a stator and a rotor having a rotor shaft, enclosed within an electric motor case,
    a dampening structure mounted between the wheel hub and a vehicle bearing member to allow vertical movement of the wheel relative to the bearing member and dampening such movement,
    a reduction gear transmitting movement from the electric motor to the wheel hub and comprising a reduction gear case attached to the electric motor case, an input member of the reduction gear and an output member of the reduction gear engaged with the input member, wherein
    the input member is arranged on the rotor shaft, and the output member comprises an output shaft mounted parallel to the rotor shaft, the output shaft being fixedly connected to the wheel hub, and
    the reduction gear case is rotatably mounted within the wheel hub, and the electric motor case is connected in movable manner to the dampening structure.

2. The motor wheel according to claim 1, wherein the dampening structure comprises
    a connecting yoke having two ends and a connecting cylindrical portion, wherein the cylindrical portion is received in the wheel hub and mounted on the at least one hub bearing,
    a rod extending between the ends of the connecting yoke and fixedly connected thereto, damper springs, and a support movably mounted on the rod, the support being connectable with the vehicle bearing member, wherein each damper spring is mounted between one of the ends and the support.

3. The motor wheel according to claim 2, wherein the electric motor case has a cylindrical shape and comprises an axial protrusion, a guiding groove is arranged in the support of the damping construction, and the motor wheel further comprises a receiving part movably mounted in the guiding groove and connected with the axial protrusion.

4. The motor wheel according to claim 3, wherein the axial protrusion is connected with the receiving part so as to form a joint hinge.

5. The motor wheel according to claim 3, wherein the receiving part is able to rotate while moving in the guiding groove.

6. The motor wheel according to claim 3, further comprising a damper mounted between the support and the receiving part to dampen movement of the receiving part relative to the support.

7. The motor wheel according to claim 1, wherein the electric motor is one of a synchronous salient-pole electric motor and a synchronous electric motor comprising permanent magnets.

8. The motor wheel according to claim 1, wherein the electric motor is an electric motor with one of a radial, axial and transverse magnetic flux direction.

9. The motor wheel according to claim 1, wherein the reduction gear is a gear reducer comprising a reducer case, the input member of the gear comprises a driver gear and an output member of the gear comprises a follower gear and an output shaft, mounted within the reducer case, wherein the driver gear is integral with the electric motor rotor shaft, and the follower gear is fixedly mounted on the output shaft and engaged with the driver gear.

10. The motor wheel according to claim 1, wherein the reduction gear is a belt drive comprising a belt drive case, the input member of the drive comprises a driving pulley and the output member of the drive comprises a following pulley coupled to the driving pulley by means of a belt and an output shaft, mounted within the belt drive case, wherein the driving pulley is integral with the electric motor rotor shaft, and the following pulley is fixedly mounted on the output shaft.

11. The motor wheel according to claim 1, wherein the reduction gear is a chain drive comprising a chain drive case, the input member of the drive comprises a driving sprocket and the output member of the drive comprises a following sprocket coupled to the driving sprocket by means of a chain and an output shaft, mounted within the chain drive case, wherein the driving sprocket is integral with the electric motor rotor shaft, and the following sprocket is fixedly mounted on the output shaft.

12. The motor wheel according to claim 1, wherein the reduction gear is a variable drive comprising a variable drive case, the input member of the drive comprises a driving pulley and the output member of the drive comprises a following pulley coupled to the driving pulley by means of a belt and an output shaft, mounted within the variable drive case, wherein each of the pulleys comprises a pair of cones facing each other and mounted coaxially and movable relative to each other in order to adjust reduction ratio, wherein the driving pulley is mounted on the electric motor rotor shaft, and the following pulley is mounted on the output shaft.

13. The motor wheel according to claim 1, wherein the reduction gear is a magnetic gear reducer comprising a reducer case, the input member of the reducer comprises a driver gear and the output member comprises a follower gear and an output shaft, mounted within the reducer case, wherein the driver gear is integral with the electric motor rotor shaft, and the follower gear is fixedly mounted on the output shaft and engaged with the driver gear.

14. The motor wheel according to claim 1, wherein the output shaft is connected with the wheel hub by means of a splined joint.

15. A vehicle comprising at least one motor wheel, the motor wheel comprising:

a wheel comprising a wheel hub and at least one hub bearing, an electric motor comprising a stator and a rotor having a rotor shaft, enclosed within an electric motor case, a dampening structure mounted between the wheel hub and a vehicle bearing member to allow vertical movement of the wheel relative to the bearing member and dampening such movement, a reduction gear transmitting movement from the electric motor to the wheel hub and comprising a reduction gear case attached to the electric motor case, an input member of the reduction gear and an output member of the reduction gear engaged with the input member, wherein the input member is arranged on the rotor shaft, and the output member comprises an output shaft mounted parallel to the rotor shaft, the output shaft being fixedly connected to the wheel hub, and the reduction gear case is rotatably mounted within the wheel hub, and the electric motor case is connected in movable manner to the dampening structure.

* * * * *